United States Patent [19]
Davis et al.

[11] 3,776,751
[45] Dec. 4, 1973

[54] METHOD OF PRODUCING REINFORCED THERMOPLASTIC MATERIALS

[75] Inventors: John Howard Davis, Bengeo; Brian Norman Hendy, Welwyn, both of England

[73] Assignee: Imperial Chemical Industries Limited, London, England

[22] Filed: Apr. 26, 1971

[21] Appl. No.: 137,705

Related U.S. Application Data

[63] Continuation-in-part of Ser. No. 843,226, July 18, 1969, abandoned.

[30] Foreign Application Priority Data
Aug. 6, 1968  Great Britain ................... 34,526/68

[52] U.S. Cl. ........................ 117/4, 117/63, 117/65.2, 117/126 AB, 117/126 GB, 117/126 GS, 117/161 UN
[51] Int. Cl. ........................ B32h 31/18, B32b 17/10
[58] Field of Search ............... 117/126 GB, 126 GS, 117/126 AB, 63, 65.2, 161 UN, 4

[56] References Cited
UNITED STATES PATENTS

| | | | |
|---|---|---|---|
| 2,877,501 | 3/1959 | Bradt | 117/4 |
| 3,451,538 | 6/1969 | Trementozzi | 260/85.5 HC |
| 3,367,793 | 2/1968 | Atwell | 117/126 GB |
| 3,441,466 | 4/1969 | Sterman et al. | 117/126 GB |
| 3,449,153 | 6/1969 | Saligny et al. | 117/63 |

OTHER PUBLICATIONS

Sterman et al., "Silane Coupling Agents for Reinforced Thermoplastics," Modern Plastics, July, 1966, pp. 133–134, 136, 138, 141–142, 195, 199, 200.

Chadbourne, "Closer Look at Fiberglass–Reinforced Thermoplastics," Product Engineering, May 15, 1961, pp. 95–97.

*Primary Examiner*—William D. Martin
*Assistant Examiner*—William A. Schmidt
*Attorney*—Cushman, Darby & Cushman

[57] ABSTRACT

Depositing a copolymer of acrylonitrile and aromatic olefin from an emulsion onto a glass-fibre reinforcing material, separating and drying the coated reinforcing material.

6 Claims, No Drawings

A METHOD OF PRODUCING REINFORCED THERMOPLASTIC MATERIALS

This application is a continuation-in-part of our United States Application Ser. No. 843226 filed 18th July 1969, now abandoned, the disclosure of which is incorporated herein by reference.

This application relates to a process for the production of reinforced thermoplastic materials and to the reinforced thermoplastic materials thereby produced. In particular the invention relates to the reinforcing of thermoplastic materials which are produced by polymerisation in a liquid medium.

Conventionally reinforced thermoplastic materials are obtained by compounding a powdered or granular thermoplastic material with the reinforcing material and the mixture then processed by the conventional plastics fabrication techniques. For example, the powdered or granular thermoplastic may be tumble blended with the reinforcing material or may be compounded therewith in a conventional extruder. Many polymers are however produced as dispersions, slurries or emulsions in a liquid medium and thus when using these techniques it is necessary that they be separated from the liquid medium before they are compounded with the filler material.

According to the present invention we provide a process for the production of mouldable thermoplastic materials containing glass fibre reinforcing material comprising depositing a copolymer of acrylonitrile and at least one aromatic olefin containing at least 50 percent by weight of units derived from acrylonitrile from an aqueous emulsion onto a reinforcing material, separating the reinforced material from the aqueous emulsion medium and drying the coated reinforcing material.

The coated reinforcing materials thus obtained may subsequently be processed into articles of reinforced thermoplastic materials by any of the conventional techniques for processing thermoplastic materials such as extrusion, injection moulding and compression moulding.

The process of the present invention is suitable for the production of mouldable materials from most thermoplastics and they may be deposited onto the reinforcing materials from an emulsion, dispersion, slurry or solution of the thermoplastic in any suitable liquid medium. From an economic point of view we prefer that the liquid medium be water and the process of the present invention is particularly applicable to thermoplastic materials that are produced by polymerisation in an aqueous medium, for example, polymers and copolymers of vinyl chloride, polymers and copolymers of vinylidene chloride, and especially copolymers of acrylonitrile and at least one aromatic olefin, preferably styrene or α-methyl styrene containing large amounts, preferably more than 50 percent by weight of acrylonitrile. Optionally the copolymers of acrylonitrile and styrene may contain minor amounts of a third monomer to give desired properties such as maleimides and N-aryl maleimides which give rise to polymers of higher softening point. These polymers are generally produced as a dispersion or an emulsion in water and may therefore conveniently be mixed with the reinforcing material in the state they are obtained from the polymerisation vessel and then deposited onto the reinforcing material by adding a material which destroys the effect of the emulsifying agent or dispersing agent. Alternatively the reinforcing material may be added to the product of the polymerisation reaction in the polymerisation vessel.

Any suitable reinforcing material may be used in the process of the present invention. We prefer to use a fibrous reinforcing material as the ability of fibrous materials to retain the thermoplastic that is deposited thereon is greater than with non-fibrous materials. Our preferred materials therefore are glass fibres in matt or chopped roving form and especially glass wool, asbestos fibres, mineral wools and natural and synthetic textile fibres. Other, non-fibrous fillers may be used in our process although the fibrous materials are preferred; examples of suitable non-fibrous materials are mica, glass plates and particulate fillers such as talc, clay and calcium carbonate. Generally, the reinforcing material should be coated with a coupling agent which improves the adhesion of the material to the thermoplastic. Our preferred coupling agents are the various silanes, especially γ-aminopropyl-triethoxysilane or vinyl trichlorosilane. Coupling agents are particularly useful when the reinforcing material is fibrous glass.

The operation of the process of the present invention will now be illustrated with reference to a polymer which is obtained as an emulsion in water directly from the polymerisation vessel. The polymer emulsion is run out from the vessel into a bath and a matt of glass wool is dipped into the bath and the wet matt removed therefrom and dipped into a bath of a coagulant such as magnesium sulphate so that the polymer is deposited onto the glass fibres. The fibre matt is stirred while in the bath of coagulant which is preferably heated to accelerate and ensure a high degree of coagulation. The bath of coagulant is cooled and the coated fibrous material separated from the liquid material by filtration. The coated material may then be washed if necessary and dried. The coated material readily breaks up so that crumbs or granules of polymer containing glass fibre are obtained which may then be processed into the desired shaped articles by conventional processing techniques such as extrusion, injection moulding or compression moulding.

In one embodiment of this invention reinforced sheet material may be produced by passing a continuous web of fibrous material through a bath containing an emulsion or dispersion of the polymer and then through a bath of a coagulant which releases the polymer from the emulsifier or dispersing agent and deposits it on the web of fibrous material. If necessary the coated web may be washed; it should then be dried and passed between a series of compression rollers which are heated to above the softening temperature of the thermoplastic material which thus flows to fill the interstices between the fibres to produce fibre reinforced sheet. An advantage of using this technique is that sheet containing long fibres may be obtained whereas if fibre reinforced sheets are obtained by extrusion (as is generally the case) the fibres will be comminuted during their passage along the extruder. The advantage of the presence of long fibres is that the sheet has increased strength along the length of the fibres.

The present invention is illustrated but in no way limited by reference to the accompanying examples.

EXAMPLE 1

A sample of glass wool was washed in trichloroethylene, dipped in a 2 percent by volume solution of γ-aminopropyltriethoxysilane in petroleum ether and then dried. 50 grams of this treated glass wool was dipped into 810 mls of a latex of a copolymer of acrylonitrile and styrene containing 26.8 mole percent of styrene. The latex had a solids content of 28.3 percent and a 0.5 percent solution of the copolymer in dimethyl formamide had a reduced viscosity of 0.88 at 25° C. The glass wool was removed from the bath of the latex and, after being allowed to drain leaving behind 250 mls of the latex, was added to 1000 mls of a 1 percent solution of magnesium sulphate (as coagulant) which was stirred and heated to 60° C. The mixture was allowed to cool to room temperature, filtered, washed twice with 1000 mls of methanol and finally dried.

163 grams of polymer coated glass fibres were obtained which were compression moulded at 200° C for 5 minutes in a 20 ton Tangye press to produce a pale yellow translucent plaque. The plaque had a flexural strength of $14.1 \times 10^3$ pounds per square inch, a 10 thou notch impact strength of 1.19 ft lb/in$^2$, an unnotched impact strength of 5.12 ft lb/in$^2$ and a flexural modulus of $8.37 \times 10^5$ psi. The sample was shown to contain 32.6 percent by weight of glass by burning the sample and determining the amount of glass in the ash.

EXAMPLE 2

The process of Example 1 was repeated using 50 grams of cut glass rovings which had been washed in chloroform in place of the glass wool. The rovings were dipped in the latex, passed into magnesium sulphate solution to coagulate the latex as in Example 1. The product was then washed with two batches of 1200 mls of methanol. The product obtained weighed 116 grams and was compression moulded at 200° C for 5 minutes as in Example 1. The moulding contained 41.2 percent by weight of glass, had a flexural strength of $21.2 \times 10^3$ psi and a flexural modulus of $12.6 \times 10^5$ psi.

EXAMPLE 3

50 grams of glass wool prepared according to Example 1 were soaked in 810 mls of a blend of a latex containing 29.6 percent solids of a copolymer of acrylonitrile and styrene containing 25.9 mole percent of styrene, a 0.5 percent solution of which in dimethyl formamide had a reduced viscosity of 0.60 at 25° C, and a graft rubber latex containing 10 percent polybutadiene which had been prepared by polymerising acrylonitrile and styrene in the proportions 75/25 in the presence of polybutadiene.

The soaked glass wool was then processed as in Example 1 to yield 173 grams which was compression moulded at 200° C for 5 minutes. An opaque, pale yellow moulding was obtained which had a flexural strength of $11.2 \times 10^3$ pounds per square inch, a flexural modulus of $7.19 \times 10^5$ psi, a 10 thou notch impact strength of $1.16 \times 10^3$ ft lb/in$^2$ and an unnotched strength of 4.12 ft lb/in$^2$. The moulding contained 28.5 percent by weight of glass fibre.

The copolymers of Examples 1,2 and 3 were prepared by a method similar to that of Example 1 of our copending U.S. application Ser. No. 62799, filed Aug. 11, 1970, and the graft copolymer of Example 3 was prepared by a method similar to that of Example 5 of application Ser. No. 62799, filed Aug. 11, 1970.

We claim:

1. A process for the production mouldable thermoplastic materials containing glass fibre reinforcing material comprising depositing a copolymer of acrylonitrile and at least one aromatic olefin, said copolymer containing at least 50% by weight of units derived from acrylonitrile, from an aqueous emulsion onto the reinforcing material by coagulation, separating the reinforced material from the aqueous emulsion medium, drying the coated reinforcing material and breaking up the dried coated reinforcing material into crumbs or granules of the copolymer containing glass fibre.

2. A process according to claim 1 wherein said aromatic olefin is styrene.

3. A process according to claim 1 in which the thermoplastic material is mixed with the reinforcing material in the state in which it is obtained from the polymerisation vessel and deposited onto the reinforcing material by adding a substance which destroys the effect of the emulsifying or dispersing agent.

4. A process according to claim 1 in which the reinforcing material is added to the polymer in the polymerisation vessel in which it is produced.

5. A process according to claim 1 in which the reinforcing material is coated with a coupling agent.

6. A process for the production of reinforced sheet which comprises passing a continuous web of fibrous material through an aqueous emulsion or dispersion containing a thermoplastic copolymer of acrylonitrile and at least one aromatic olefin, said copolymer containing at least 50 percent by weight of units derived from acrylonitrile and then passing the web through a bath of a coagulant which releases the thermoplastic copolymer and deposits it on the web of fibrous material, drying the coated web and passing it between at least one pair of compression rollers heated to above the softening temperature of the thermoplastic copolymer.

* * * * *